United States Patent Office 3,297,564
Patented Jan. 10, 1967

3,297,564
HYDROCRACKING CATALYST AND PROCESS WITH THE USE OF A CATALYST COMPOSITE FROM THE IRON GROUP ADMIXED WITH PLATINUM OR RHODIUM ON A SILICEOUS CRACKING BASE
Reese A. Peck, Fishkill, William F. Franz, Hopewell Junction, and Robert M. Suggitt, Fishkill, N.Y., and Leon W. Cook, Sarasota, Fla., and Donald A. Messing, Glenham, N.Y., assignors to Texaco Inc., New York, N.Y., a corporation of Delaware
No Drawing. Filed Sept. 24, 1964, Ser. No. 399,078
15 Claims. (Cl. 208—111)

This invention relates to the catalytic hydrocracking of hydrocarbon oils to lower boiling products and to an improved catalyst therefor. More particularly, it relates to a process for converting hydrocarbon oils in the middle boiling range into premium gasoline employing a hydrocracking catalyst comprising as the hydrogenating component an oxide or sulfide of an iron group metal together with a minor proportion of a platinum metal or the oxide or sulfide thereof on an active cracking catalyst carrier.

Hydrocracking catalysts conventionally comprise metals of groups V, VI, and VIII of the periodic table, as well as the oxides, sulfides and salts of such metals deposited on or in association with cracking catalysts comprising refractory metal oxides of various types. The most active catalysts of this type which have been employed heretofore, such as those comprising nickel or platinum as the hydrogenating component deposited on an active cracking catalyst base, have the disadvantage of producing relatively high amounts of dry gases i.e., propane and lighter, which are undesirable by-products in a process for producing gasoline. These catalysts have other disadvantages such as a tendency to "run away" at higher temperatures. In addition, they have a particular disadvantage in hydrocracking operations for the production of premium motor fuels, wherein they destroy desirable naphthene and aromatic compounds present in the feed stock and also lower the iso- to normal paraffin ratio. It has been found heretofore that higher octane gasolines, containing higher proportions of aromatics and naphthenes and having higher iso- to normal paraffin ratios are obtained in this process employing catalysts comprising metal oxides and sulfides as the hydrogenating component. However, catalysts of this type which have been employed heretofore generally produce substantially reduced conversions per pass and their activity drops off sharply at temperatures in the range below about 600° F., wherein the advantage of improved product quality in the naphtha fractions is principally obtained.

The hydrocracking catalysts employed in accordance with our invention overcome the above disadvantages of the prior art catalysts and provide a combination of high activity over a wide temperature range with high conversion to products in the desired boiling range. When employed in hydrocracking operations for the production of premium gasoline, they provide high conversions per pass to products in the naphtha boiling range, which are substantially equal to or even higher than those obtained with the most active hydrocracking catalysts employed heretofore, and in addition they produce high octane products and products of high reforming potential.

The hydrocracking catalysts of our invention are composed of a hydrogenating component selected from the class consisting of oxides and sulfides of iron group metals and mixtures thereof, and a minor proportion of a hydrogenating component selected from the class consisting of platinum metals, i.e., metals of the platinum and palladium series, having atomic numbers of 44–46 and 76–78, particularly platinum, rhodium, ruthenium and palladium, and the oxides and sulfides of such metals and mixtures thereof. The catalyst may comprise about 3–15 percent by weight of the iron group metal compound and about 0.05–1.5 percent by weight of the platinum metal or platinum metal compound, the remainder being a siliceous cracking catalyst which serves as a support for the hydrogenating components. It preferably comprises about 4–12 percent by weight of iron group metal compound and about 0.1–1.0 percent by weight of platinum metal or compound thereof. Particularly preferred catalysts contain about 5–7 percent of an iron group metal compound and about 0.1–0.5 percent of platinum metal or platinum metal compound.

The cracking catalyst serving as a carrier for the hydrogenating catalyst may be any refractory siliceous material having substantial cracking activity. Suitable materials for this purpose include naturally occurring and synthetically prepared oxide mixtures such as silica-alumina, silica-magnesia, silica-zirconia, silica-titania, silica-alumina-titania, zeolites such as chabazite, analcite, faujasite, etc. Particularly suitable materials are silica-alumina cracking catalysts, including acid treated clays such as Super-Filtrol, synthetic gels obtained by coprecipitation or impregnation methods and crystalline zeolites that have been base-exchanged to produce acidic crystalline alumino-silicates.

Synthetic silica-alumina gels employed for this purpose ordinarily comprise about 10–30 percent by weight of alumina and about 70–90 percent by weight of silica. The cracking catalyst may be activated by treatment with fluorine, hydrogen floride or other active fluorine containing compounds. Preferred cracking catalysts include silica-alumina gels comprising about 10–20 percent by weight af alumina and about 80–90 percent by weight of silica and fluorided products obtained from such gels containing 2–6 percent by weight of $AlF_3$.

Catalysts of the above composition, comprising two different hydrogenating components of the character and in the proportions described, provide substantial advantages in hydrocracking operations over catalysts comprising either of the hydrogenating components as the sole hydrogenating component, as discussed hereinabove. However, it is not to be inferred that all of these catalysts, comprising various combinations of iron group metal oxide and sulfides with platinum group metal oxides and sulfides are equivalent in their hydrocracking activity, since they differ in the degree to which their advantages are obtained as well as in the operating conditions under which they are most advantageously employed. The preferred catalysts for use in hydrocracking processes for the production of premium gasoline comprise a hydrogenating component selected from the group consisting of oxides and sulfides of cobalt and nickel and a hydrogenating component selected from the group consisting of oxides and sulfides of platinum and rhodium on silica-alumina cracking catalyst support.

While the above catalysts may be employed very advantageously in hydrocracking operations generally, they are particularly useful in the conversion of hydrocarbon oils such as heavy naphthas, kerosenes and gas oils to motor fuels of high octane ratings. A special advantage is obtained by employing these catalysts in the hydrocracking of oils boiling in about the range 400–700° F. and containing substantial proportions of polynuclear aromatics, such as recycle stocks from catalytic cracking operations which may very advantageously contain at least about 25 percent of aromatics, to obtain motor fuels containing substantial proportions of benzene and alkyl benzenes as well as high amounts of naphthenes and having high iso- to normal paraffin ratios.

The operating conditions employed in the hydrocracking process include temperatures in the range from 500° F. to about 800° F., superatmospheric pressures up to about 5,000 pounds per square inch gauge, a feed rate of about 0.1–10.0 volumes of feed per volume of catalyst per hour, and a stoichiometric excess of hydrogen. Preferred conditions comprise temperatures in about the range 550–750° F., pressures in about the range 500–2500 pounds per square inch gauge, feed rates in about the range 0.5–4 volumes of feed per volume of catalyst per hour and about 500–8,000 cubic feet of hydrogen per barrel of hydrocarbon feed. The process may be carried out either as a once-through or a recycle operation, employing either a fixed bed, moving bed or fluid catalyst system. It is preferably carried out in a fixed catalyst bed operation employing hydrogen recycle.

The catalysts employed in accordance with this invention may be prepared in any known manner. They are suitably prepared by impregnating a preformed cracking catalyst base with aqueous solutions of water soluble metal salts either in a single step or in successive steps, followed by drying and converting the metal salts by any convenient method to the desired metal compounds. The catalyst may be formed into pellets either before or after the impregnation and drying step by pilling, extrusion or other known methods. A lubricant is advantageously employed in this operation, a suitable lubricant being a hydrogenated vegetable oil such as Sterotex.

Advantageously, when a platinum type component is being impregnated on pre-formed cracking catalyst pellets, more uniform distribution may be obtained by the use of a complexing agent such as ethylene diamine. Amines and ammonia may also serve as complexing agents.

Suitable water soluble metal salts employed in the catalyst preparation include particularly the chlorides, acetates and nitrates. The catalyst after drying is usually heated at a temperature range of about 500–800° F. to decompose the metal salts and then further heated at about 1000–1200° F. to insure removal of all adsorbed vapors. A further treatment may be carried out to convert the oxides to the sulfides if desired by treating with hydrogen sulfide at temperatures above about 500° F., either with or without a prior reduction with hydrogen.

Changes in the catalyst composition may take place during the hydrocracking operation to a greater or less extent depending upon the process conditions. Some conversion of metal oxide and metallic metal to metal sulfide will ordinarily occur, when sulfur-containing compounds are present in the feed stock. Also, some reduction of metal oxides and sulfides to metallic metal and to metal sulfides in a reduced form probably takes place under the ordinary hydrocracking conditions, involving the presence of hydrogen in large excess at elevated temperatures and pressures. The catalyst during the hydrocracking operation will therefore probably comprise an equilibrium mixture of metallic metals and metal sulfides, or of metallic metals, metal sulfides, and metal oxides, depending upon the original catalyst composition.

When the catalyst becomes spent during the hydrocracking process to a degree such that its activity is substantially impaired by the deposition of carbonaceous material and occlusion of nitrogen compounds, it may be regenerated by controlled burning with a mixture of oxygen and nitrogen at temperatures in about the range 800–1100° F., followed, if desired, by conversion of the metal oxides produced to the corresponding sulfides.

The following examples are given for the purpose of further disclosing the invention:

Example I

A catalyst comprising nickel oxide and metallic platinum as the hydrogenating component was prepared by impregnating a silica-alumina cracking catalyst with a mixture of nickel acetate and chloroplatinic acid, drying and heating.

The cracking catalyst employed in the preparation was a commercially obtained material comprising 13 percent by weight of $Al_2O_3$ and 87 percent by weight of $SiO_2$ in the form of ⅛ inch diameter pills having a surface area of 641 square meters per gram. This catalyst was heated for three hours at 1000° F. and 475 grams of the catalyst was then mixed thoroughly with a solution of 31 cc. of $H_2PtCl_6 \cdot 6H_2O$, containing 0.5 gram of Pt per cc., and 83 gram of nickel acetate in 350 cc. of water. The mixture was allowed to stand overnight, the excess solution poured off and the solid material dried in a rotary evaporator. The excess solution was then mixed with the dry material and the mixture again dried and finally heated in an electric furnace for three hours at 1000° F. The catalyst thus obtained comprised 5 percent of NiO, 0.125 percent of Pt, 12.3 percent of $Al_2O_3$ and 82.6 percent of $SiO_2$, by weight.

The above catalyst was employed for hydrocracking a cycle gas oil from a fluid catalyst cracking operation which had been treated to reduce its nitrogen content. This latter operation was carried out employing an $NiO-MoO_3-Al_2O_3$ catalyst at a temperature of about 705° F., a pressure of 1,000 pounds per square inch gauge, a liquid hourly space velocity of about two volumes of oil per hour per volume of catalyst and a hydrogen recycle rate of 15,000 standard cubic feet per barrel of oil. The oil which was obtained by this treatment was employed in this example and had the following properties:

| | |
|---|---|
| Gravity, ° API | 32.7 |
| Distillation, ° F.: | |
| IBP–5% | 416–475 |
| 10–20% | 498–518 |
| 30–40% | 530–544 |
| 50–60% | 556–570 |
| 70–80% | 586–604 |
| 90–95% | 628–646 |
| EP | 664 |
| Composition, vol. percent: | |
| Aromatics | 35 |
| Olefins | 3 |
| Saturates | 62 |
| Sulfur, wt. percent | 0.010 |
| Nitrogen, p.p.m. | 1 |

The reaction conditions employed in the hydrocracking operation included a pressure of 1500 pounds per square inch gauge, a temperature of 575° F., a liquid hourly space velocity of 1.0 volume of oil per hour per volume of catalyst and a hydrogen feed rate of 7500 standard cubic feet per barrel of hydrocarbon feed. Table I below shows the results obtained in the above process employing the NiO-Pt catalyst as compared with those obtained in the process under the same conditions except that the catalyst employed contained NiO or Pt alone as the hydrogenating component, being otherwise of the same composition and prepared in the same manner.

TABLE I

| | Run No. | | |
|---|---|---|---|
| | 1 | 2 | 3 |
| Catalyst Hydrogenating Component (wt. percent) | | | |
| | NiO (5.125) | Pt (5.125) | NiO (5) plus Pt (0.125) |
| $C_4+$ product: | | | |
|   Yield, vol. percent | 109.4 | 111.0 | 112.1 |
|   Gravity, °API | 42.9 | 45.4 | 54.3 |
| Light Naphtha:[1] | | | |
|   Yield, vol. percent | 8.9 | 8.6 | 22.5 |
|   Octane No. (+3 cc. TEL) | 93.7 | | 97.6 |
| Heavy Naphtha:[2] | | | |
|   Yield, vol. percent | 14.9 | 25.7 | 36.0 |
|   Octane No. (+3 cc. TEL) | | 80.0 | 80.2 |
|   Aromatics content, vol. percent | 25.5 | 0 | 5.5 |
|   Naphthene-paraffin ratio | 2.5 | 0.6 | 2.4 |
| Iso/Normal Ratio: | | | |
|   $C_4$ | 3.0 | 3.8 | 4.3 |
|   $C_5$ | 15.8 | 5.2 | 13.9 |
|   $C_6$ | 19.2 | 3.5 | 15.9 |

[1] $C_5$–200° F.
[2] 200–400° F.

The above data show that the $C_4+$ product obtained in Run No. 3 had a very substantially higher API gravity than the $C_4+$ product obtained in Run Nos. 1 and 2, while the yield of $C_4+$ products obtained in Run No. 3 was slightly higher than those obtained in Run Nos. 1 or 2. This indicates that a synergistic effect was obtained by employing a small amount of platinum in combination with the nickel as the hydrogenating component of the catalyst under the described conditions resulting in greatly increased hydrocracking activity without any decrease in the yield of valuable products. The data show also that greatly increased yields of both light and heavy naphthas were obtained in Run No. 3 as compared with those obtained in either Run No. 1 or Run No. 2. The data show furthermore that the gasoline quality was not adversely affected by the presence of the small amount of platinum in combination with the nickel in the catalyst, the octane rating of the light naphtha fraction from Run No. 3 being even substantially higher than that of the light naphtha fraction from Run No. 1.

The effect of the minor proportion of platinum in combination with nickel in greatly increasing the activity of the catalyst without adversely affecting the gasoline quality was particularly unexpected, since gasoline fractions obtained in hydrocracking operations with platinum-containing catalysts ordinarily contain no aromatics and both low iso to normal paraffin ratios and low naphthene-paraffin ratios as shown by the results obtained in Run No. 2.

*Example II*

A catalyst comprising nickel sulfide and platinum sulfide as the hydrogenating components on an HF activated silica-alumina cracking catalyst was prepared by impregnating the activated cracking catalyst with nickel acetate and chloroplatinic acid, drying, heating at a higher temperature to decompose the metal compounds and finally treating with hydrogen sulfide. The silica-alumina cracking catalyst employed in the preparation was a commercially obtained material comprising 12.4 percent by weight of $Al_2O_3$ and 87.6 percent by weight of $SiO_2$ in the form of $5/32$ inch extrusions having a surface area of 657 square meters per gram, a pore volume of 0.50 cc. per gram and pore diameter of 59 Angstroms. HF treatment was carried out upon 276 grams of this material which had been previously dried at 1,000° F. for three hours, by mixing the dried material with 190 cc. of dilute HF, containing 0.05 gram of HF per cc., and 50 cc. of water, allowing the mixture to stand overnight and drying on a steam plate. The treated material was mixed with a solution obtained by dissolving 50 grams of nickel acetate and 0.95 gram of $H_2PtCl_6 \cdot 6H_2O$ in 250 cc. of water, the mixture allowed to stand overnight, dried in a rotary evaporator and heated at 1000° F. for three hours. The catalyst was then purged with $H_2S$ and heated in a slow stream of $H_2S$ for six hours at 700° F. It was finally cooled in $H_2S$ and purged with nitrogen for one hour. The catalyst thus obtained comprised 0.125 percent PtS, 6.1 percent NiS, 4.4 percent $AlF_3$, 8.1 percent $Al_2O_3$ and 81.3 percent $SiO_2$, by weight.

The above catalyst was employed for hydrocracking a cycle gas oil from a fluid catalyst cracking process, which had been treated to reduce its nitrogen content as described in Example I. The treated oil has the following properties:

Gravity, °API _____ 33.2
Distillation, °F.:
  IBP–5% _____ 442
  10–20% _____ 486–498
  30–40% _____ 507–516
  50–60% _____ 527–539
  70–80% _____ 553–570
  90–95% _____ 592–608
  EP (percent OH) _____ 620 (98.5)
Composition, vol. percent:
  Aromatics _____ 31
  Olefins _____ 2
  Saturates _____ 67
Sulfur, wt. percent _____ 0.03
Nitrogen, p.p.m. _____ 1–2

The hydrocracking operation was carried out at 575° F. and at 650° F. The other conditions employed were the same as those described in Example I.

Table II below shows the results obtained in the hydrocracking operation carried out at 650° F. in terms of yields and character of the products obtained from the above catalyst comprising both NiS and PtS as a hydrogenating component in comparison with the results obtained in the process under the same conditions but employing catalysts containing only one of these hydrogenating components, being otherwise of the same composition and prepared in the same manner.

TABLE II

| | Hydrogenating Component (wt. percent) | | | |
|---|---|---|---|---|
| | NiS (6) | PtS (0.5) | NiS (6) plus PtS (0.125) | NiS (6) plus PtS (0.5) |
| Temperature, °F | 650 | 650 | 650 | 650 |
| Yield, vol. percent: | | | | |
|   $C_4$–200° F | 97.4 | 73.0 | 115.1 | 101.5 |
|   200–400° F | 18.3 | 40.7 | 16.8 | 29.5 |
|   400–EP | 0 | 0 | 0 | 0 |
|   Total $C_4$–400° F | 115.7 | 113.7 | 131.9 | 131.0 |
| Octane Rating (+3 cc. TEL): | | | | |
|   Light Naphtha | 98.9 | 96.6 | [1] 98.0 | 98.1 |
|   Heavy Naphtha | | 78.8 | | 88.0 |

[1] Some pentanes missing.

Table III below shows the results obtained in the hydrocracking operation carried out at 575° F.

TABLE III

|  | Hydrogenating Component (wt. percent) | | |
| --- | --- | --- | --- |
|  | NiS (6) | NiS (6) plus PtS (0.125) | NiS (6) plus PtS (0.5) |
| Temperature, °F | 575 | 575 | 575 |
| Yield, vol. percent: | | | |
| $C_4$—200° F | 56.8 | 93.6 | 79.2 |
| 200–400° F | 50.5 | 35.2 | 44.6 |
| 400–EP | | 0 | 2.9 |
| Total $C_4$—400° F | 107.3 | 128.8 | 123.8 |
| Octane Rating (+3 cc. TEL): | | | |
| Light Naphtha | 95.8 | 97.7 | 98.1 |
| Heavy Naphtha | 82.0 | 88.0 | 84.3 |

As shown by the data given in Tables II and III, the catalyst comprising both NiS and PtS gave very appreciably higher yields of $C_4$—400° F. products than did the catalysts comprising either NiS or PtS as the sole hydrogenating component. In addition, the catalyst comprising only 0.125 percent of PtS (NiS-PtS ratio of 48:1) was substantially more active than the catalyst comprising 0.5 percent of PtS (NiS-PtS ratio of 12:1) as shown by the substantially higher amount of $C_4$—200° F. product obtained with the former. The data also show that the activity of the catalyst comprising NiS as the sole hydrogenating component falls off much more sharply than does that of the catalyst comprising both NiS and PtS when the hydrocracking temperature is reduced from 650° F. to 575° F.

*Example III*

A catalyst comprising cobalt sulfide and rhodium sulfide as the hydrogenating component on a silica-alumina cracking catalyst was prepared by impregnating the cracking catalyst with cobalt acetate and rhodium chloride, heating to decompose the metal compounds and treating with $H_2S$. The cracking catalyst employed in the preparation was a material of the same character as that described in Example II. It was dried for three hours at 1,000° F. and 472 grams of the dried material were mixed with a solution of 83 grams of cobalt acetate in 350 cc. of water, the mixture allowed to stand overnight and dried on a steam plate. It was then mixed with a solution of 26 grams of rhodium chloride in 300 cc. of water, allowed to stand overnight and dried as before. The impregnated material thus obtained was heated in an electric furnace for three hours at 1,000° F. and thereafter heated in a slow stream of $H_2S$ at 700° F. for six hours. It was finally cooled in $H_2S$ and purged with nitrogen. The catalyst thus obtained comprised 0.5 percent $Rh_2S_3$, 6 percent CoS, 12.1 percent $Al_2O_3$ and 81.4 percent $SiO_2$, by weight.

The above catalyst was employed for hydrocracking a hydrocarbon oil of the same character as that described in Example II and under the same conditions except that the operation was carried out at 575° F. Table IV below shows the results obtained in this operation employing the catalyst described in comparison with the results obtained under the same conditions employing catalysts comprising only one of the hydrogenating components, being otherwise of the same composition and prepared in the same manner.

TABLE IV

|  | Run No. | | |
| --- | --- | --- | --- |
|  | 1 | 2 | 3 |
|  | Catalyst Hydrogenating Component (wt. percent) | | |
|  | CoS (6) | $Rh_2S_3$ (0.5) | CoS (6) plus $Rh_2S_3$ (0.5) |
| Yield, $C_4$—400° F. products | 42.3 | 46.6 | 100.3 |
| Aromatics reduction, vol. percent | 43.5 | 98.9 | 67.6 |
| Iso/Normal ratio: | | | |
| $C_4$ | 1.8 | 6.1 | 2.8 |
| $C_5$ | 15.9 | 11.2 | 13.3 |
| $C_6$ | 25.2 | 6.3 | 12.1 |

As shown by the above data, the catalyst comprising a mixture of cobalt and rhodium sulfides as the hydrogenating component produced a yield which was over twice as great as that produced by catalysts containing either of these components alone as the hydrogenating component. In addition, the catalyst comprising this combination of hydrogenating components produced a much lower aromatic reduction and higher iso-normal paraffin ratios of the paraffins in the gasoline boiling range than did the catalyst comprising rhodium sulfide as the sole hydrogenating component.

Obviously, many modifications and variations of the invention as hereinbefore set forth may be made without departing from the spirit and scope thereof, and therefore only such limitations should be imposed as are indicated in the appended claims.

We claim:
1. A hydrocracking catalyst composition comprising a hydrogenating catalyst deposited on an active siliceous cracking catalyst support, said hydrogenating catalyst comprising about 3–15 percent by weight based on the total weight of the said hydrocracking catalyst composition of a first hydrogenating component selected from the group consisting of oxides and sulfides of iron group metals and mixtures thereof and about 0.125–0.5 percent by weight based on the total weight of the said hydrocracking catalyst composition of a second hydrogenating component selected from the group consisting of platinum and rhodium metals, their oxides and sulfides and mixtures thereof.

2. The catalyst composition of claim 1 wherein the weight ratio of said first hydrogenating component to said second hydrogenating component is at least about 10:1.

3. The catalyst composition of claim 1 wherein said siliceous cracking catalyst comprises about 10–30 percent by weight of alumina and about 70–90 percent by weight of silica.

4. The catalyst composition of claim 3 wherein said silica-alumina cracking catalyst contains about 2–6 percent by weight of $AlF_3$ in said composition.

5. The catalyst composition of claim 1 wherein the iron group metal is cobalt.

6. The catalyst composiiton of claim 1 wherein the iron group metal is nickel.

7. The catalyst composition of claim 1 wherein the second hydrogenating component comprises rhodium.

8. The catalyst composiiton of claim 1 wherein the second hydrogenating component comprises platinum.

9. The catalyst composition of claim 1 wherein the support comprises a crystalline zeolite.

10. A hydrocracking catalyst composition comprising a hydrogenating catalyst on a silica-alumina cracking catalyst support comprising about 10–30 percent by weight of alumina and about 70–90 percent by weight of silica, said hydrogenating catalyst consisting essentially of about 3–15 percent by weight based on the total weight of the said hydrocracking catalyst composition of a first hydrogenating component selected from the group consisting of nickel and cobalt oxides and sulfides and mixtures thereof, and about 0.125–0.5 percent by weight based on the total weight of the said hydrocracking catalyst composition of a second hydrogenating component selected from the group consisting of platinum and rhodium, their sulfides and mixtures thereof.

11. The catalyst composition of claim 10 wherein the first hydrogenating component comprises nickel oxide and the second hydrogenating component comprises platinum.

12. The catalyst composition of claim 10 wherein the first hydrogenating component comprises cobalt sulfide and the second hydrogenating component comprises rhodium sulfide.

13. The catalyst composition of claim 10 wherein the first hydrogenating component comprises nickel sulfide and the second hydrogenating component comprises platinum sulfide.

14. A process for hydrocracking a hydrocarbon charge which comprises contacting it in the presence of hydrogen under hydrocracking conditions with a hydrocracking catalyst composite comprising a hydrogenating catalyst supported on an active siliceous cracking catalyst, said hydrogenating catalyst consisting essentially of about 3–15 percent by weight based on the total weight of said hydrocracking catalyst composite of a first hydrogenating component selected from the group consisting of oxides and sulfides of iron group metals and mixtures thereof and about 0.125–0.5 percent by weight based on the total weight of the said hydrocracking catalyst composite of a second hydrogenating component selected from the group consisting of platinum and rhodium metals, their oxides and sulfides and mixtures thereof.

15. The process of claim 14 wherein the said hydrocarbon charge comprises at least about 25 percent by volume of aromatic compounds.

References Cited by the Examiner

UNITED STATES PATENTS

| | | | |
|---|---|---|---|
| 3,073,777 | 1/1963 | Oettinger | 208—111 |
| 3,147,207 | 9/1964 | Doumani | 208—111 |
| 3,197,397 | 7/1965 | Wight et al. | 208—111 |

DELBERT E. GANTZ, *Primary Examiner.*

ABRAHAM RIMENS, *Examiner.*